United States Patent [19]

Buell

[11] 4,284,774

[45] Aug. 18, 1981

[54] SULFOARYLATED NIGROSINE DYE AND USE IN JET-PRINTING INKS

[75] Inventor: Bennett G. Buell, Bridgewater, N.J.

[73] Assignee: American Cyanamid Company, Stamford, Conn.

[21] Appl. No.: 92,005

[22] Filed: Nov. 7, 1979

[51] Int. Cl.$^3$ .............................................. C09B 57/00
[52] U.S. Cl. ...................................... 544/348; 106/22
[58] Field of Search ......................................... 544/348

[56] References Cited

U.S. PATENT DOCUMENTS

| | | | |
|---|---|---|---|
| 1,878,531 | 9/1932 | Neelmeier et al. | 544/348 |
| 2,990,405 | 6/1961 | Pepper et al. | 544/348 |
| 3,705,043 | 12/1972 | Zabiak | 106/20 |

Primary Examiner—Paul M. Coughlan, Jr.
Attorney, Agent, or Firm—Bruce F. Jacobs

[57] ABSTRACT

Nigrosine base is aryl sulfonated to produce a dye useful in jet-printing inks.

10 Claims, No Drawings

SULFOARYLATED NIGROSINE DYE AND USE IN JET-PRINTING INKS

This invention relates to sulfoarylated nigrosine dyes, a process for preparing the same, and the use of them. More particularly, the invention relates to sulfoarylated nigrosine dyes which are useful in jet-printing inks. These dyes may also be called nigrosine base aryl monosulfonates in that the nigrosine base is substituted with at least one $ArSO_3A$ group wherein Ar is aryl and A is hydrogen or alkali metal.

A dye for use in jet-printing inks must meet many requirements among which are high solubility in aqueous media and high-color value. In addition, it must not impart too high a viscosity to the ink; the ink prepared from it must pass readily through a fine filter and have reasonable fastness to rubbing, soaking, etc. General requirements for jet-printing inks are discussed by Zabiak in U.S. Pat. No. 3,705,043, incorporated herein by reference.

C. I. Acid Black 186 (S) is a sulfonated nigrosine which performs reasonably well in most respects and is the present dye of choice for jet printing. However it is deficient in soak resistance in that it loses about 30% of its strength in the standard test for soak resistance.

There is a need, therefore, for a new nigrosine dye composition which will better meet all of the requirements of jet-printing usage.

In accordance with the present invention, there is provided a process for preparing novel sulfoarylated nigrosine dyes and novel nigrosine dye compositions obtainable thereby.

More particularly, the invention relates to the preparation of novel sulfoarylated nigrosine dye compositions by reacting the diazonium salt of a monosulfonated aniline with a solution of nigrosine base (C. I. Solvent Black 7) in a cyclic nitrogen-containing base, preferably pyridine, and recovering a water-soluble sulfoarylated nigrosine dye therefrom after treating the reaction mixture with an alkali base. This reaction is surprising because attempts to react the diazonium salts of metanilic acid and sulfanilic acid with nigrosine base in acetic acid and N,N-dimethylformamide gave no reaction.

The dye compositions obtained with the dye of this invention have a remarkably neutral black shade; that is, no discernible blue, red, or green tint is evident, and on dilution a true gray is obtained. When formulated as a jet-printing ink, it shows good soak resistance on hard paper, losing only about 3.5–15% of its strength versus a loss of about 30% for C. I. Acid Black 186 (S).

The structures of the sulfoarylated nigrosine dyes of the present invention are not known with certainty since the exact structure of the nigrosine base starting material is not known.

Nigrosine base (Colour Index 50415:1) is conventionally made by heating (a) nitrobenzene, aniline, and aniline hydrochloride with iron or copper at 180°–200° C. or (b) nitrophenol or the nitro-cresols, aniline and aniline hydrochloride with a little iron at 180°–200° C. In either case the resultant nigrosine base is a complex mixture probably containing compounds with two azine systems or with both an azine and an oxazine system. For purposes of the present invention, the effective molecular weight of the nigrosine base is considered to be about 179.19 based upon a chemical composition of $C_{12}H_7N_2$.

The sulfoarylated nigrosine dyes of the present invention contain at least 0.5 sulfoaryl group per effective molecular weight of nigrosine base. Preferably they contain about 0.55 to 1.0 sulfoaryl groups and most preferably about 0.6 to 0.8 sulfoaryl groups.

These dyes may be prepared by reacting the nigrosine base with a diazonium salt of a monosulfonated aromatic amine, with the reaction being conducted in the presence of a cyclic nitrogen-containing base, preferably pyridine.

More specifically the dyes may be prepared as follows: a diazonium solution of a monosulfonated aromatic amine, such as metanilic acid, sulfanilic acid, or orthoanilic acid, or mixtures of such acids is prepared by mixing essentially equimolecular amounts of the acid, sodium nitrite, and caustic soda in water. The solution is then poured onto a mixture of ice and concentrated hydrochloric acid to obtain a clear solution. Sulfamic acid is then added to the clear solution to destroy excess nitrous acid. Optionally, the pH may be raised to about 4 by the addition of a saturated solution of sodium acetate in water before the next step.

The diazonium solution is then added dropwise to a stirred solution containing the nigrosine base in pyridine. The diazonium solution used herein contains about 0.5–2, preferably about 1.5, relative molecular proportions per effective molecular proportion of nigrosine base. The temperature should be maintained at about 0°–20° C., preferably 8°–15° C., for a period of about ½–3 hours, preferably about 1–2 hours. Preferably, the addition is continued until an excess of the diazonium compound persists in the reaction mixture for about 2 or 3 minutes which may be determined by dispersing a droplet of the reaction mixture in water and adding it to H-salt. The presence of excess diazonium compound is indicated by the development of a blue-black color.

After the addition is completed, the reaction mixture is stirred at about 0°–20° C., preferably at about 10° C., for about 1–10 hours, preferably about 1 hour, and the pH is preferably adjusted to about 10 by the addition of an alkali metal base such as sodium hydroxide. The pyridine may then be removed by any suitable means such as distillation, preferably by steam-stripping, until the temperature of the residue rises to 102°–103° C. The residue may then be cooled and filtered to remove any insoluble materials.

The acid form of the present dyes may be obtained by acidifying the mother liquor to a pH of about 1, preferably below 1, with concentrated hydrochloric acid. The resulting precipitate is then separated, washed with water, and dried in a vacuum oven at about 75° C.

The alkali metal salt form of the present dyes may be obtained by treating the aforementioned mother liquor with alkali metal salts, such as sodium chloride, sodium acetate, to precipitate the alkali metal salt, preferably the sodium salt, of the product. The pH of the mother liquor for salting out the alkali metal salt should be about 8 to 12, preferably about 9.

The alkali metal salts of the products can be purified by stirring the crude salt in N,N-dimethylformamide for several hours, separating the insoluble inorganic salts, diluting the resulting mother liquor with isopropanol to precipitate an essentially salt-free dye, and recovering the precipitate.

That the product is the result of arylation rather than diazo coupling is based on the following observations:
1. During the addition of the diazonium solution, much gas, presumably nitrogen, evolves.

2. The nitrogen content of the product is lower than expected.
3. The C/N and S/N Ratios come closer to that of a product of arylation, rather than that of coupling.

Jet-ink compositions may be prepared by uniformly mixing the black dye of the present invention, with a humectant and water. The dye is generally present in about 1% to 20% by weight, preferably about 5% to 10% by weight, while the humectant is generally present in about 5% to 30% by weight, preferably about 20% by weight. The remainder is water, or water plus minor amounts of conventional jet-ink stabilizing agents such as N-methylpyrollidone. The final jet-ink composition should have a viscosity not exceeding 2.4 centistokes at 77° F.

Conventional humectants include the aliphatic polyols, preferably alkylene glycols such as ethylene glycol, butylene glycol, propylene glycol, hexylene glycol, diethylene glycol, dipropylene glycol, triethylene glycol, and the like including commercially available polyethylene glycols, such as Carbowax ® 200 and 400, having average molecular weights of 200 and 400 respectively.

Alkyl ethers of the above-listed polyols may also be used if the alkyl group contains about 1 to 6 carbon atoms.

Mixtures of the polyols and polyol ethers may also be used.

In the examples which follow, the following method was used to determine soak resistance:

A 10% solution of the dye was prepared in a solvent consisting of 20% polyethylene glycol (molecular weight 200) in water. The solution was passed through a microporous filter having a fine pore size and a draw-down was made on hard paper. After setting for at least an hour at room temperature, a portion of the draw-down was suspended in water in such a way that both the inked and plain portions of the paper were soaked in the water. A visual comparison was then made between the soaked and unsoaked portions of the paper, especially in relation to the contrast between the inked and plain parts of the paper.

EXAMPLE 1

A solution of metanilic acid (64.59 grams; 0.37 mole) In a mixture of 375 mls of water and 77 mls of 5 N sodium hydroxide is prepared and sodium nitrite (25.9 grams; 0.375 mole) is dissolved in it. The resulting solution is poured onto a mixture of 400 grams of ice and 93 mls of concentrated hydrochloric acid. Sulfamic acid (0.1 gram) is added to the clear solution to destroy the excess nitrous acid and the solution is made neutral to Congo Red indicator paper by the addition of 106 mls of a saturated solution of sodium acetate in water. This solution is then added dropwise to a stirred solution of nigrosine base (44.75 grams; 0.25 effective mole) in 1800 mls of pyridine at 5°–10° C. over a period of two hours. During the addition, bubbles of nitrogen escape from the reaction mixture. After the addition is completed, the reaction mixture is stirred for an additional one-half hour, 134 mls of 5 N sodium hydroxide is added, and the pyridine is steam-stripped from the mixture until the temperature of the mixture rises to 102° C. The remaining aqueous mixture is treated with 5 N hydrochloric acid to lower the pH to 8.9 and the insoluble material is removed by gravity filtration. The resulting filtrate is then treated at 40°–45° C. with salt (425 grams) to salt out the product. After stirring for two hours, the product is isolated by filtering, and dried at 75° C. in a vacuum oven to obtain 82.25 grams, having an absorptivity at 570 nanometers of 6.62 and the following analysis:
Found: C,35.04; H,2.17; N,3.64; S,4.22; Cl,24.75; $H_2O$ 5.33

The above product dissolves in aqueous ink solvents to produce a black ink. A draw-down of a 10% ink solution in water containing 20% polyethylene glycol (200 avg. molecular weight) produces a neutral black of good color value. On paper it shows very good soak resistance when immersed in water in comparison with an ink prepared from C. I. Acid Black 186 (S) which is almost completely removed from the paper.

EXAMPLE 2

A solution of sulfanilic acid (24.47 grams; 0.14 mole) in a mixture of 140 mls of water and 28.8 mls of 5 N sodium hydroxide is prepared and sodium nitrite (9.8 grams; 0.142 mole) is added to it. The resulting solution is poured onto a mixture of 175 grams of ice and 42 mls of concentrated hydrochloric acid with stirring. The resulting slurry of the diazonium compound is added slowly to a stirred solution of nigrosine base (16.0 grams; 0.09 effective mole) in 500 mls of pyridine, while maintaining the temperature at 15°–20° C., over a period of about ¾ hour. After completion of the addition, the reaction mixture is stirred for an additional hour, 19 mls of 50% sodium hydroxide is added, and the pyridine is removed under vacuum in a rotary evaporator heated externally with steam. The residue is dissolved in 500 mls of hot water and the solution is filtered through a fluted filter paper. The insolubles are washed with 500 mls of water and the combined filtrate and washings is treated with 25 mls of concentrated hydrochloric acid. The resulting mixture is digested on a steam bath and then filtered. The precipitate is washed with a small amount of water, pressed as dry as possible, and finally dried in a high-vacuum oven over flakes of potassium hydroxide to obtain 10.15 grams of product having an absorptivity at 570 nanometers of 13.4 and the following analysis:
Found: C,59.78; H,3.55; N,8.13; S,5.00; C/N,7.35; S/N,0.62; C/S,11.96

The above product is dissolved in a solution containing 20% polyethylene glycol (avg. molecular weight of 200) in water to produce a black ink. A draw-down of a 10% solution in this solvent produces a neutral black on hard paper. The soak resistance is very good in comparison with a sample of an ink prepared from C. I. Acid Black 186 (S).

EXAMPLE 3

The following example is for comparison purposes to illustrate the effect of a second sulfonic acid group on soak resistance.

A solution of aniline-2,5-disulfonic acid (7.8 grams; 0.027 mole) in a mixture of 100 mls of water and 16 mls of 5 N hydrochloric acid is diazotised with sodium nitrite (1.90 grams; 0.027 mole) at 5° C. The excess nitrous acid is destroyed by adding sulfamic acid to the solution and the resulting solution is added dropwise to a solution nigrosine base (2.54 grams; 0.0143 effective mole) in 150 mls of pyridine until a total of 75 mls is added. During the addition much gas is evolved. After the addition is completed, the reaction mixture is stirred for an additional hour, 12.8 mls of 5 N sodium hydroxide is added to adjust the pH to 10.5, and the solution is heated to 90° C. and filtered. the filtrate is cooled and diluted with 1500 mls of isopropanol to precipitate the product which is isolated, washed with isopropanol, and dried in vacuo over potassium hydroxide flakes to obtain 6.56 grams, having an absorptivity at 595 nanometers of 13.0.

A draw-down of a 10% solution of this product shows poor soak resistance in water.

What is claimed is:

1. Nigrosine base aryl monosulfonate containing at least about 0.5 aryl monosulfonate groups of the structure —Ar—SO$_3$A wherein Ar is aryl and A is hydrogen or alkali metal per effective formula weight of nigrosine base.

2. The monosulfonate of claim 1 wherein the aryl group is phenyl.

3. The monosulfonate of claims 1 or 2 wherein A is an alkali metal.

4. The monosulfonate of claim 1 wherein about 0.55 to 1.0 aryl monosulfonate groups are present per effective formula weight of nigrosine base.

5. The monosulfonate of claim 1 wherein about 0.6 to 0.8 aryl monosulfonate groups are present per effective formula weight of nigrosine base.

6. The monosulfonate of claim 1 wherein the aryl monosulfonate group is a sodium phenyl sulfonate group.

7. A process for preparing the compound of claim 1 comprising adding about 0.5 to 2 relative molecular proportions of a diazonium compound of an aromatic amine of the formula $$H_2N-Ar-SO_3H$$

wherein Ar is aryl to each effective formula weight of nigrosine base in the presence of a cyclic nitrogen-containing base at about 0° to 20° C. for about ½ to 3 hours, stirring the reaction solution at about 0° to 20° C. for an additional 1 to 10 hours, raising the pH to about 10 by adding an alkali base, removing the nitrogen-containing base, and either (a) acidifying to a pH of about 1 and recovering the resultant acid precipitate or (b) treating with an alkali metal salt to precipitate the product as an alkali metal salt.

8. The process of claim 7 wherein the aromatic amine is selected from the group consisting essentially of sulfanilic acid, metanilic acid, orthanilic acid, and mixtures thereof.

9. The process of claim 7 wherein the cyclic nitrogen-containing base is pyridine.

10. The process of claim 7 wherein the addition is at a temperature of about 8° to 15° C. for about 2 hours, the stirring is at a temperature of about 10° C. for about 1 hour.

* * * * *